United States Patent
Yoon et al.

(10) Patent No.: US 9,985,532 B1
(45) Date of Patent: May 29, 2018

(54) PULSE FREQUENCY MODULATION MODE TRANSITIONS FOR SINGLE STAGE POWER CONVERTER

(71) Applicant: Dialog Semiconductor Inc., Campbell, CA (US)

(72) Inventors: Juyoung Yoon, Campbell, CA (US); Fuqiang Shi, Campbell, CA (US)

(73) Assignee: DIALOG SEMICONDUCTOR INC., Campbell, CA (US)

(*) Notice: Subject to any disclaimer, the term of this patent is extended or adjusted under 35 U.S.C. 154(b) by 0 days. days.

(21) Appl. No.: 15/401,498

(22) Filed: Jan. 9, 2017

(51) Int. Cl.
| | |
|---|---|
| *H02M 7/00* | (2006.01) |
| *H02M 7/5383* | (2007.01) |
| *H02M 1/00* | (2006.01) |
| *H02M 7/757* | (2006.01) |
| *H02M 3/335* | (2006.01) |
| *H02M 1/08* | (2006.01) |

(52) U.S. Cl.
CPC ......... *H02M 3/33507* (2013.01); *H02M 1/08* (2013.01); *H02M 2001/0009* (2013.01)

(58) Field of Classification Search
CPC .................. H02M 3/3155; H02M 3/33507
USPC ........................... 363/73, 74, 78, 79
See application file for complete search history.

(56) References Cited

U.S. PATENT DOCUMENTS

| | | | |
|---|---|---|---|
| 8,995,150 B2* | 3/2015 | Yan ................. | H02M 3/33523 363/21.16 |
| 2012/0155122 A1* | 6/2012 | Tang ................. | H02M 3/33507 363/21.15 |
| 2013/0294118 A1* | 11/2013 | So ................... | H02M 3/33507 363/21.16 |
| 2015/0061524 A1* | 3/2015 | Kunimatsu ........ | H05B 33/0851 315/200 R |
| 2015/0124495 A1* | 5/2015 | Kong ............... | H02M 3/33592 363/21.14 |

* cited by examiner

*Primary Examiner* — Gary Nash
(74) *Attorney, Agent, or Firm* — Haynes and Boone, LLP (57) ABSTRACT

A switching power converter controller is provided that transitions between constant voltage pulse frequency modulation operation and constant current operation responsive to a comparison of a peak voltage for the constant voltage pulse frequency modulation operation and a peak voltage for the constant current operation.

20 Claims, 9 Drawing Sheets

PULSE FREQUENCY MODULATION MODE TRANSITIONS FOR SINGLE STAGE POWER CONVERTER

TECHNICAL FIELD

This application relates to switching power converters, and more particularly to switching power converters with both constant voltage and constant current modes of operation using pulse frequency modulation.

BACKGROUND

Figure 1:
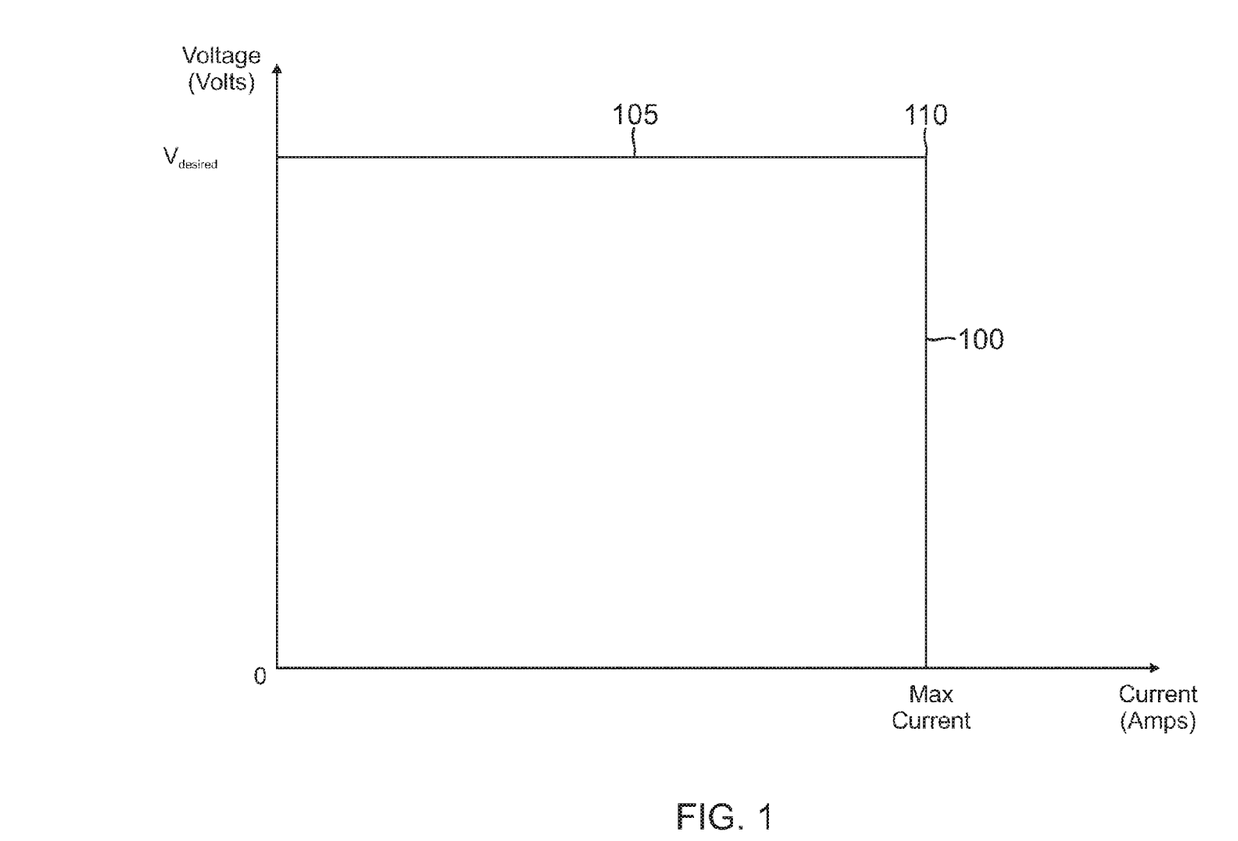
FIG. 1 illustrates the output voltage as a function of the output current for a transition between a constant voltage mode of operation employing pulse width modulation and a constant current mode of operation supplying a maximum allowed current for a full load.

A single-stage switching power converter such as a flyback converter cycles a power switch as controlled by a controller to deliver power to a load. At startup for a flyback converter operating, for example, to charge a discharged battery (full load condition), the controller cycles the power switch such that the output current and output voltage both begin to rise from their initial zero values. But the output current cannot exceed a maximum output current or components such as the power switch may be damaged. Upon reaching the maximum output current limit, the controller will thus switch into a constant current mode of operation that maintains the output current at the maximum current limit. FIG. 1 illustrates the output voltage during operation in a constant current mode 100 for a flyback converter. As the battery is progressively charged, the output voltage in constant current mode 100 will gradually rise until a desired output voltage (Vdesired) is reached at a transition point 110, whereupon the controller transitions to operate in a constant voltage mode 105. Since the controller is driving a full load, it regulates the cycling of the power switch during constant voltage mode 105 using pulse width modulation at a constant switching frequency.

Figure 2:
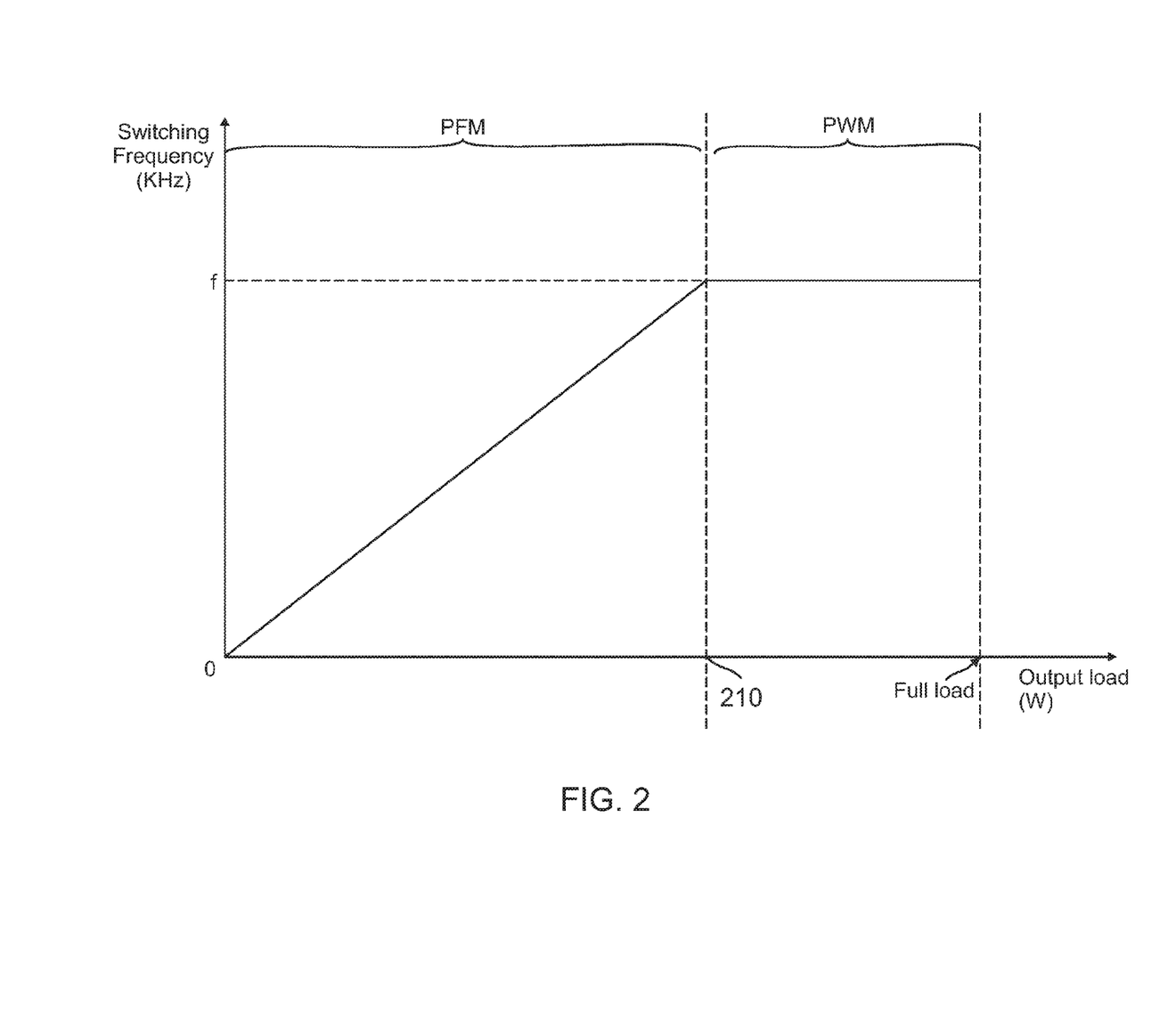
FIG. 2 illustrates the switching frequency based upon the output power for a transition between a constant voltage mode of operation employing pulse width modulation and a constant voltage mode of operation employing pulse frequency modulation.

As the load reduces (e.g., as a battery is charged), the output current continues to reduce in constant voltage mode 105 in conjunction with a reduction of the duty cycle for the pulse width modulation. But even with the pulse width progressively reduced, pulse width modulation operation will eventually overdrive the load as the load continues to reduce. The controller will thus transition into a constant voltage pulse frequency mode for light load operation as shown in FIG. 2, which illustrates the switching frequency as a function of the output load. In particular, the switching power converter will transition from the pulse width modulation (PWM) mode of operation into the pulse frequency mode (PFM) of operation at a predetermined load value that equals some fraction of the maximum load value. While operating in the PWM mode, the controller maintains the switching frequency at a maximum value Fmax. But in the PFM mode, the controller will gradually reduce from this maximum value as the load is decreased.

Although the pulse frequency modulation mode enables the controller to increase efficiency without overdriving the load during low load conditions, the controller operates in the constant voltage mode. Thus, there is a need in the art for additional control modes of operation during low load conditions.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A controller is provided that transitions between a constant voltage pulse frequency modulation mode to a constant current mode and vice versa. Such a transition between constant current and constant voltage control modes is advantageous for applications such as direct charging of a battery in which the maximum current that can be driven into the battery is limited during pulse frequency modulation mode operation. Depending upon the load's requirements, a maximum current limit may be adjusted accordingly. The following discussion will be directed to the implementation of the mode control in a flyback converter but it will be appreciated that the concepts disclosed herein are readily applied to other types of single-stage switching power converters such as buck, buck-boost, or boost converters. In addition, although it is conventional to employ pulse frequency modulation (PFM) operation as the load decreases, the PFM mode transitions disclosed herein are applicable to systems in which PFM operation is employed for heavy or full load operation.

Figure 3:
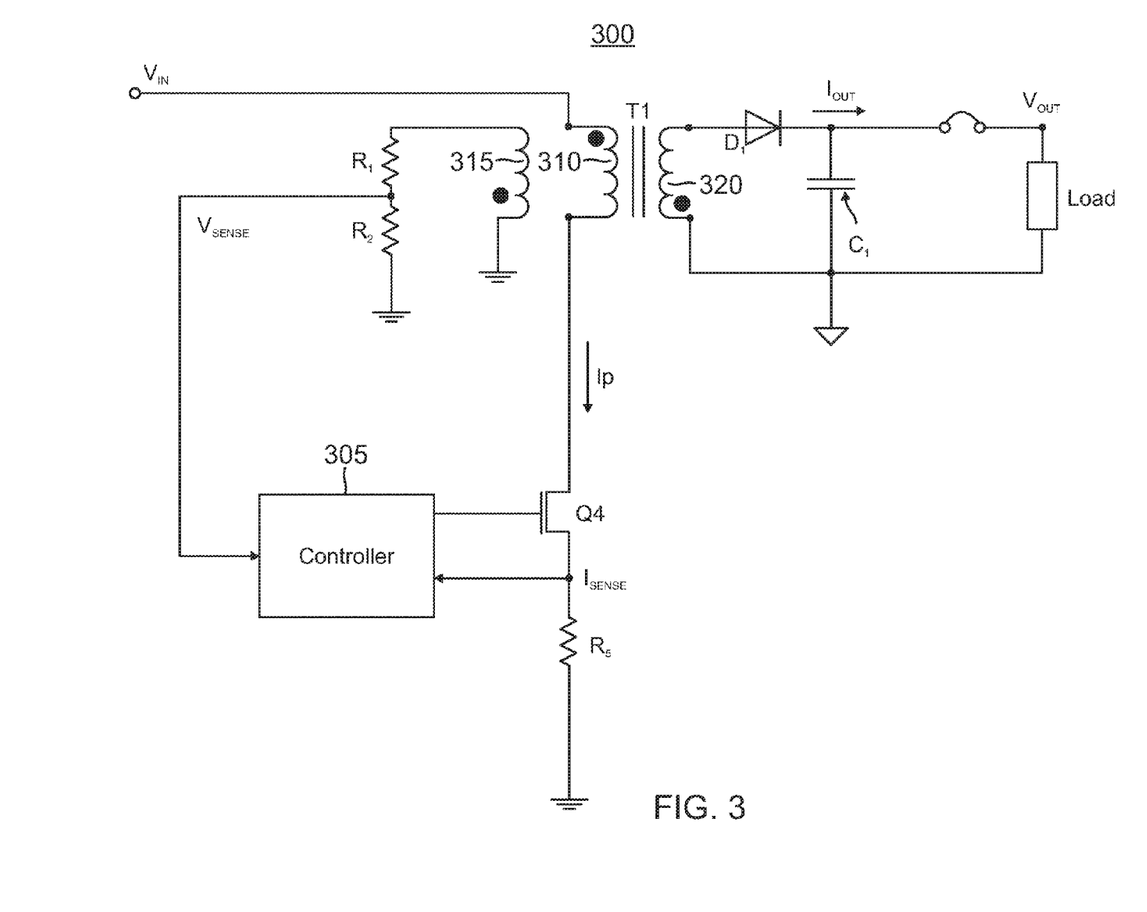
FIG. 3 is a circuit diagram of a flyback converter including a primary-side controller configured to provide a transition between a constant voltage pulse frequency modulation mode and a constant current mode supplying a current that is a fraction of the maximum allowed current of FIG. 1.

An example flyback converter 300 is shown in FIG. 3 having a controller 305 configured to transition between constant voltage pulse frequency modulation operation and constant current control as discussed further herein. Flyback converter 300 receives a rectified input voltage ($V_{IN}$) that drives a primary winding 310 of a transformer T1 when the controller 305 switches on a power switch transistor Q4. In flyback switching power converter 300, power switch transistor Q4 is a MOSFET (NMOS) transistor but it will be appreciated that bipolar junction transistor (BJT) power switches may be used in alternative embodiments. To cycle power switch transistor Q4 on, controller 305 charges its gate. Based upon the rectified input voltage $V_{IN}$ and a magnetizing inductance for transformer T1, a primary winding current in primary winding 310 then ramps up from zero to a peak current value, whereupon controller 305 switches off power switch transistor Q4 to complete a switching cycle. To sense when the desired peak current has been achieved, controller 305 receives an $I_{SENSE}$ signal such as from the voltage on a sense resistor $R_s$ coupled between the source of the power switch transistor Q4 and ground. When $I_{SENSE}$ reaches a peak voltage that correlates with the desired peak current, controller 305 switches off power switch transistor Q4. Controller 305 determines the peak voltage responsive to a feedback voltage ($V_{SENSE}$) derived from a reflected voltage on an auxiliary winding 315 through a voltage divider formed by a serial pair of resistors R1 and R2.

When controller 305 switches off power switch transistor Q4, a rectifying diode $D_1$ coupled to a second winding 320 of the transformer T1 becomes forward biased such that the stored magnetic energy in transformer T1 is delivered as an output voltage $V_{OUT}$ across a load as filtered by a load capacitor $C_1$. It will be appreciated that the rectifying diode D1 may be replaced by a synchronous rectification (SR) switch in alternative embodiments. This delivery of energy to the load produces a reflected voltage on auxiliary winding 315 that is a function of the voltage drop across the diode $D_1$ and the output voltage $V_{OUT}$. As this energy delivery is depleted, the current in secondary winding 320 will drop to zero such that there is no voltage drop across the diode $D_1$, whereupon the reflected voltage across auxiliary winding 315 is directly proportional to the output voltage $V_{OUT}$. This time is denoted as the transformer reset time (Trst) and represents the ideal time to sample the reflected voltage through $V_{SENSE}$ to obtain an accurate estimate of the output voltage $V_{OUT}$. It will be appreciated an optocoupler may be used to sense the output voltage $V_{OUT}$ in lieu of such a "primary-only" sensing.

With regard to deriving the peak voltage, it is conventional for controller 305 to include a constant voltage regulation module or functionality for controlling the cycling of power switch transistor Q4 to maintain the output voltage Vout at a constant value in both PFM and PWM operation modes. Similarly, it is conventional for controller 305 to include a constant current regulation module or functionality for controlling the cycling of power switch transistor Q4 is a constant current mode (in transitions from PWM operation). Controller 305 has adapted these regulation modules to enable a transition to constant current mode (and similarly, a transition from constant current mode to constant voltage mode) while operating in pulse frequency modulation mode (for the constant voltage operation). To better appreciate how these advantageous transitions are effected, some theory of operation for controller 305 will now be reviewed.

The average output current ($I_O$) of flyback converter 300 at full load during constant current operation can be expressed as:

$$Io = \frac{n \times \text{Ipri\_pk} \times Treset}{2 \times Tp} \quad (1)$$

where n is the transformer T1 turns ratio (n=Np/Ns), Ipri_pk is the peak primary current, Treset is the transformer reset time, and Tp is the switching period for the previous cycle of power switch transistor Q4. Referring again to FIG. 3, note that both the constant current regulation module (not illustrated) and the constant voltage regulation module (not illustrated) within controller 305 function by setting a desired peak voltage (Vpeak) for the $I_{SENSE}$ voltage sensed across the sense resistor Rs. In each cycle of power switch transistor Q4, the corresponding regulation module (either constant voltage or constant current) will open power switch transistor Q4 when the desired peak voltage is obtained. The derivation of the peak voltage for constant current operation (Vipk_CC) will now be discussed.

The constant current control mode equation for the peak voltage is expressed as:

$$\text{Vipk\_CC} = \frac{Kcc \times Tp}{Treset} \quad (2)$$

where Vipk_CC is the peak voltage value for the $I_{SENSE}$ voltage in constant current control mode, Kcc is a proportionality constant, Tp is the switching period, and Treset is the transformer reset time. In contrast to the constant current regulation module, the constant voltage regulation module processes a feedback voltage derived from the output voltage to form the peak voltage for the constant voltage operation. Given this peak voltage for constant voltage operation, the peak primary current value (Ipri_pk) can be expressed as:

$$\text{Ipri\_pk} = \frac{\text{Vipk\_CV}}{Rs} \quad (3)$$

where Vipk_CV is the peak voltage for constant voltage operation, and Rs is the sense resistor resistance.

From equation (1) through (3) above, it follows that the average output current $I_O$ equals:

$$Io = \frac{n \times Kcc \times \text{Vipk\_CV}}{2 \times Rs \times \text{Vipk\_CC}} \quad (4)$$

Referring again to FIG. 1, it may be seen that the output current for both constant voltage mode operation and constant current mode operation are equal at transition point 110. As such, at full load, Vipk_CC should equal to Vipk_CC. Thus, setting these peak voltages to be equal in equation (4) shows that that the maximum average output current (Io_max) can be expressed as:

$$\text{Io\_max} = \frac{n \times Kcc}{2 \times Rs} \quad (5)$$

Therefore, a ratio of equation (4) to equation (5) leads to the following expression $$\frac{Iout}{Io\_max} = \frac{Vipk\_CV}{Vipk\_CC} \quad (6)$$

From equation (6), it may be seen that, at any operating point in constant voltage operation, the ratio of the average output current to the maximum average output current equals the ratio of the constant voltage peak voltage (Vipk_CV) to the constant current peak voltage (Vipk_CC). It thus follows that the ratio (Vipk_CV/Vipk_CC) is less than or equal to one during constant voltage operation and is greater than one during constant current operation. Controller 305 exploits this relationship between Vipk_CC and Vipk_CC by implementing a novel current limit (Io_light) during PFM mode. This current limit is advantageous for applications such as direct battery charging in which a reduced current limit is used during light load operation (as contrasted with the maximum output current limit during PWM operation).

As such, it can be deduced that a switching power converter should operate in (or transition to) constant voltage control pulse frequency modulation mode when the ratio of Vipk_CV to Vipk_CC is less than or equal to 1, and should operate in (or transition to) constant current control mode when the ratio of Vipk_CV to Vipk_CC is greater than 1. This relationship is exploited herein to also be applied to light load operation while the switching power converter is operating in PFM mode. At the light output power transition point (load condition is light, and operating in PFM mode), a switching power converter should also be operating with the same peak current value, regardless of whether the switching power converter is operating in the constant voltage PFM (CV_PFM) mode or the constant current mode. That is, the peak voltage value in constant voltage PFM mode (Vipk_CV_PFM) should be the same as the peak voltage value in constant current mode (Vipk_CC_PFM). Substitution into equation (6) leads to:

$$\frac{Iout}{Io\_light} = \frac{Vipk\_CV\_PFM}{Vipk\_CC\_PFM} \quad (7)$$

Similarly, substitution into equation (2) gives:

$$Vipk\_CV\_PFM = Vipk\_CC\_PFM = \frac{Kcc\_light \times Tp\_cv\_pfm}{Treset} \quad (8)$$

where Kcc_light is a proportionality constant defined for the light load condition and Tp_cv_pfm is the switching period when the switching power converter is operating in the PFM mode, and Treset is the transformer reset time.

Controller 305 is configured to use the values for $I_{SENSE}$, $V_{SENSE}$, Tp, and Trst as necessary to derive the peak voltage for the constant current and constant voltage modes during PFM operation. For example, based on the information derived from $I_{SENSE}$, $V_{SENSE}$, Tp, Kcc, and Trst, controller 305 may transition between the light-load constant voltage PFM mode and the light-load constant current mode. In particular, Tp, Trst, and Kcc are used to derive the peak voltage for constant current mode as discussed with regard to equation (2). Similarly, Vsense is used to derive the peak voltage for constant voltage mode.

Figure 4:
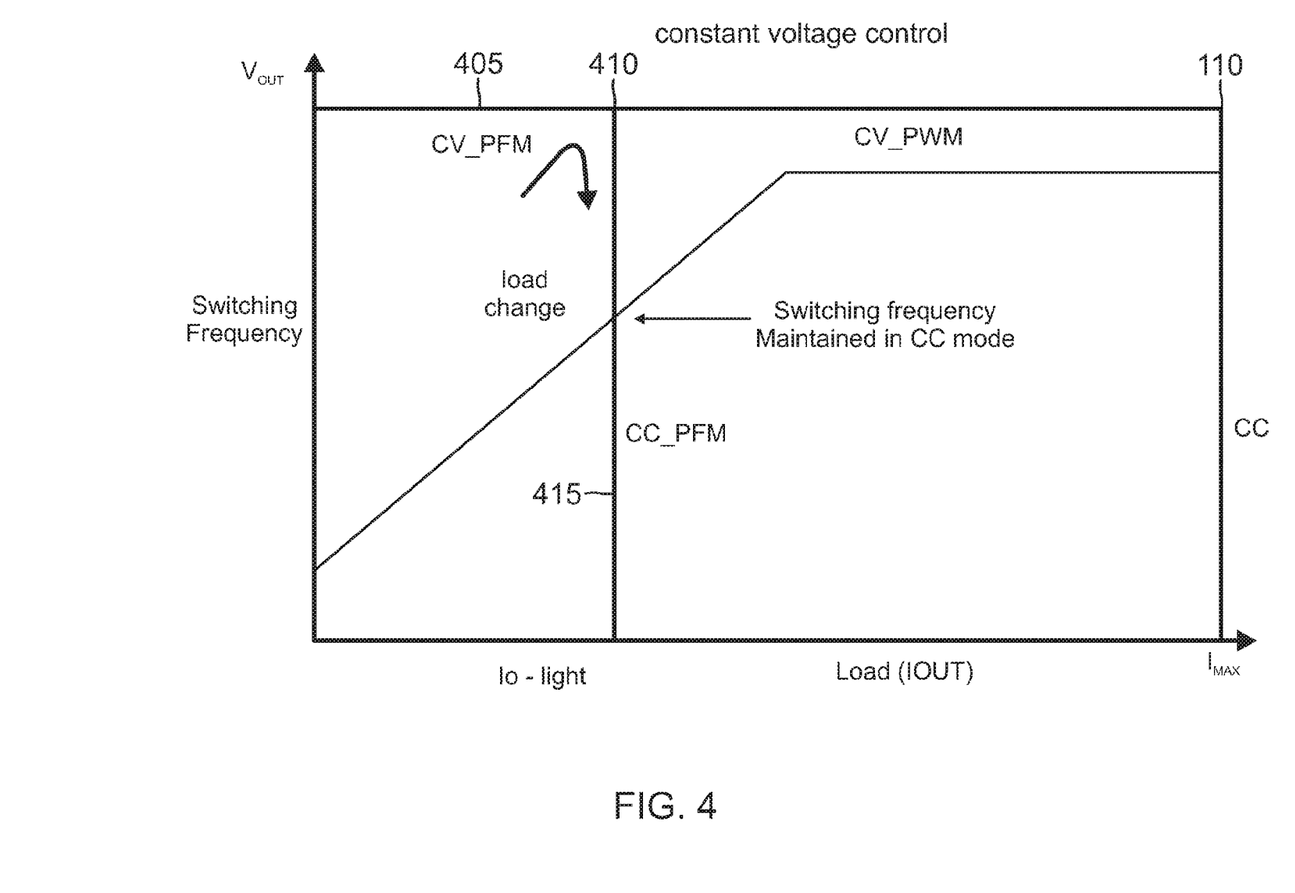
FIG. 4 illustrates the output voltage and also the switching frequency as a function of the output current for transitions between a constant voltage pulse frequency modulation mode and a first constant current mode of operation and also for transitions between a constant voltage pulse width modulation mode and a second constant current mode.

The output voltage and switching frequency as a function of the output current for the constant current and constant voltage modes in both PFM and PWM operation are shown in FIG. 4. Transition point 110 between the constant current and constant voltage modes during PWM operation is as discussed with regard to FIG. 1. But as the load (output current) is reduced, a constant voltage PFM mode 405 is used. Should the load increase beyond a low current limit Io_light (which is less than the maximum current for transition point 110 in PWM mode) during constant voltage PFM mode 405, a constant current mode 415 is activated that switches at the switching frequency used by the constant voltage mode 405 at transition point 410.

Figure 5:
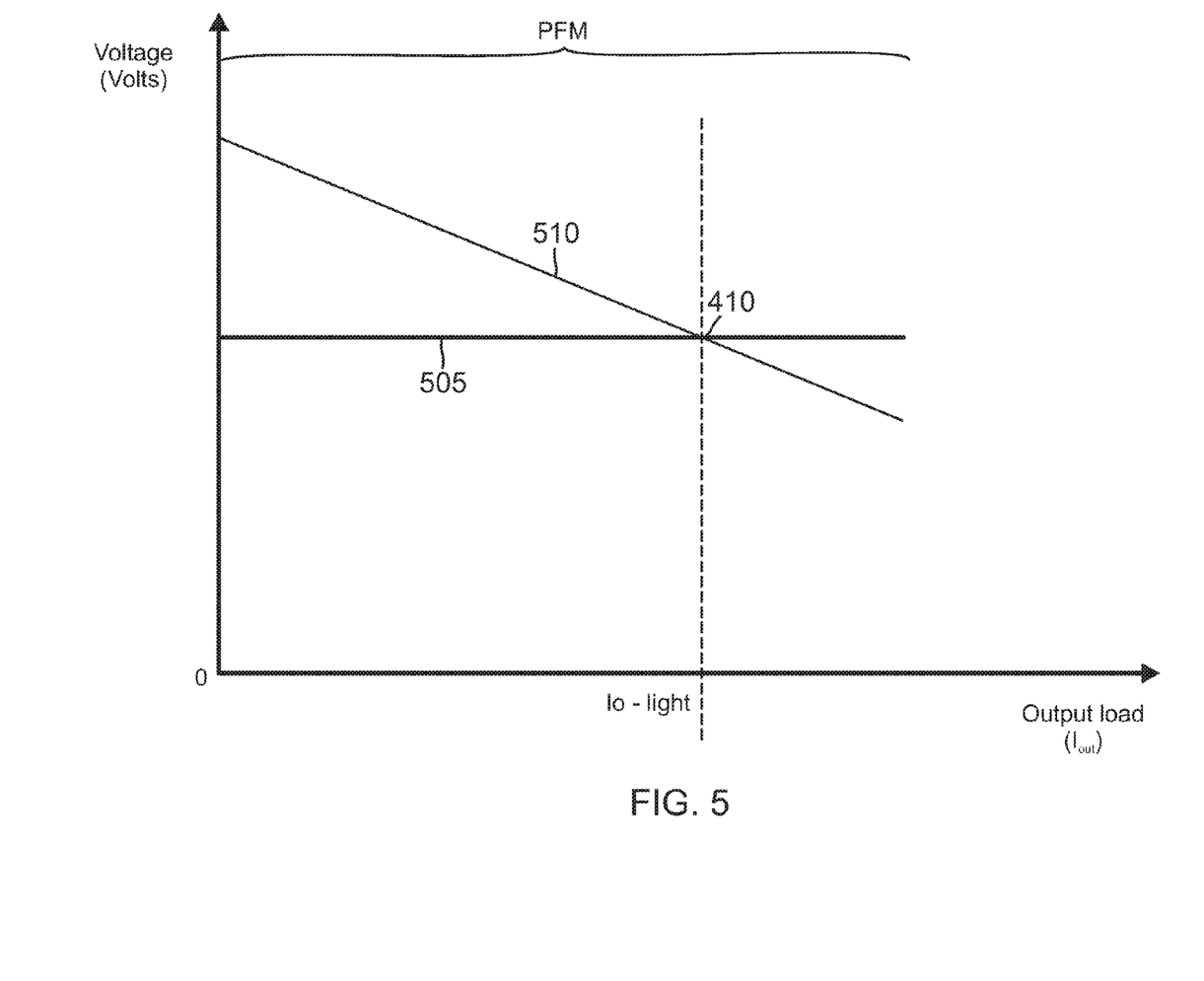
FIG. 5 illustrates the peak voltages for controlling the off-time of the power switch for both a constant current mode and a constant voltage pulse frequency modulation mode as a function of the output current wherein a transition between the constant current mode and the constant voltage pulse frequency modulation mode is not enabled.

The relationship between the peak current for the constant voltage PFM mode and the constant current mode may be better appreciated with reference to FIG. 5, which shows a CV peak voltage 505 and a CC peak voltage 510 as a function of the output load (output current Iout) during PFM operation during which a transition between the modes is not enabled at the Io_light current limit of FIG. 4. CV peak voltage 505 stays constant as the load is increased since the increase in switching frequency during pulse frequency modulation provides the output voltage regulation. In contrast, the change in the transformer reset time causes CC peak voltage 510 to decrease as the output current is increased. CC peak voltage 510 will thus be greater than CV peak voltage 505 from a zero load until transition point 410 (discussed with regard to FIG. 4) when the output current equals Io_light. Conversely, this continued decrease in CC peak voltage 510 as the load is increased causes it to be less than CV peak voltage 505 at output currents greater than Io_light.

Figure 6A:
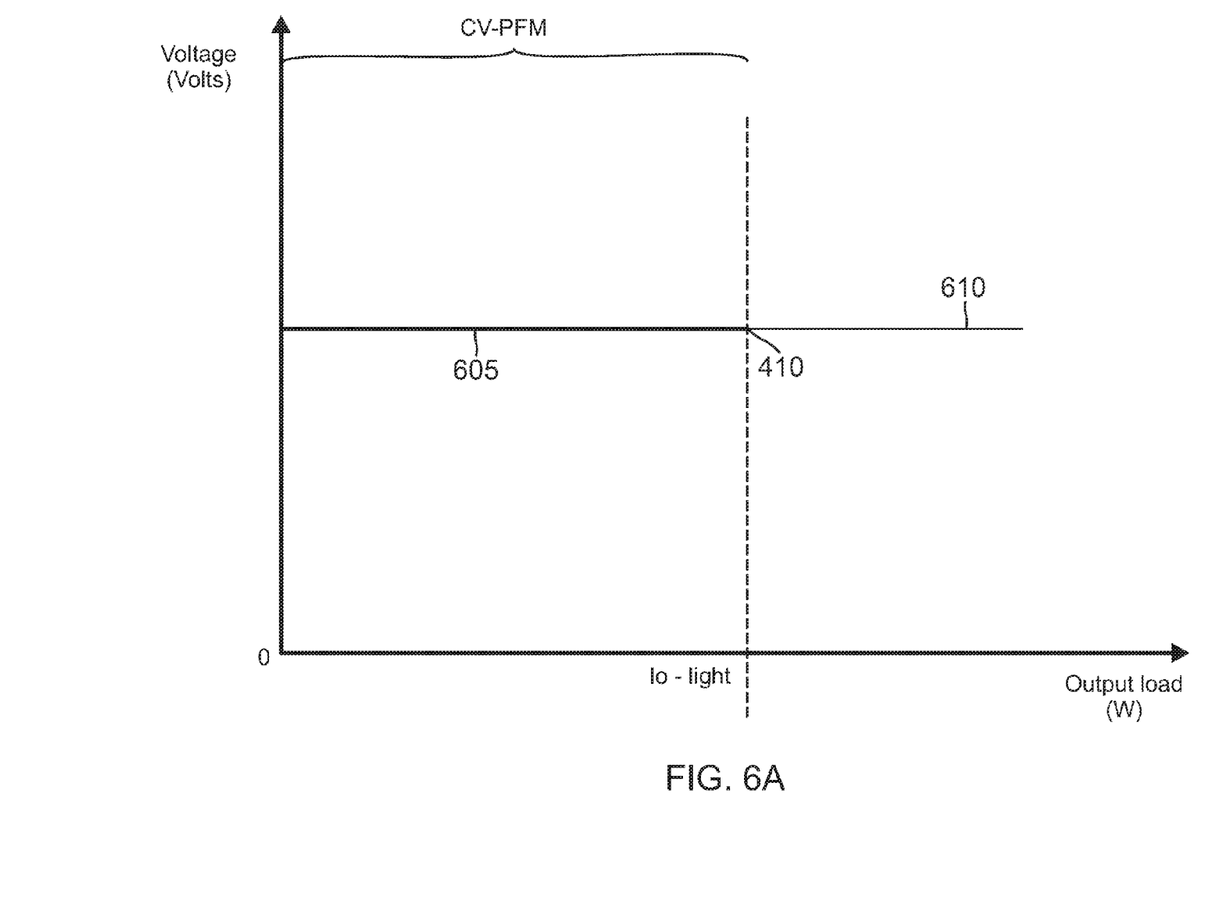
FIG. 6A illustrates the peak voltages for controlling the off-time of the power switch for both a constant voltage pulse frequency modulation mode and a constant current mode wherein a transition between the constant voltage pulse frequency modulation mode and the constant current mode is enabled.
Figure 6B:
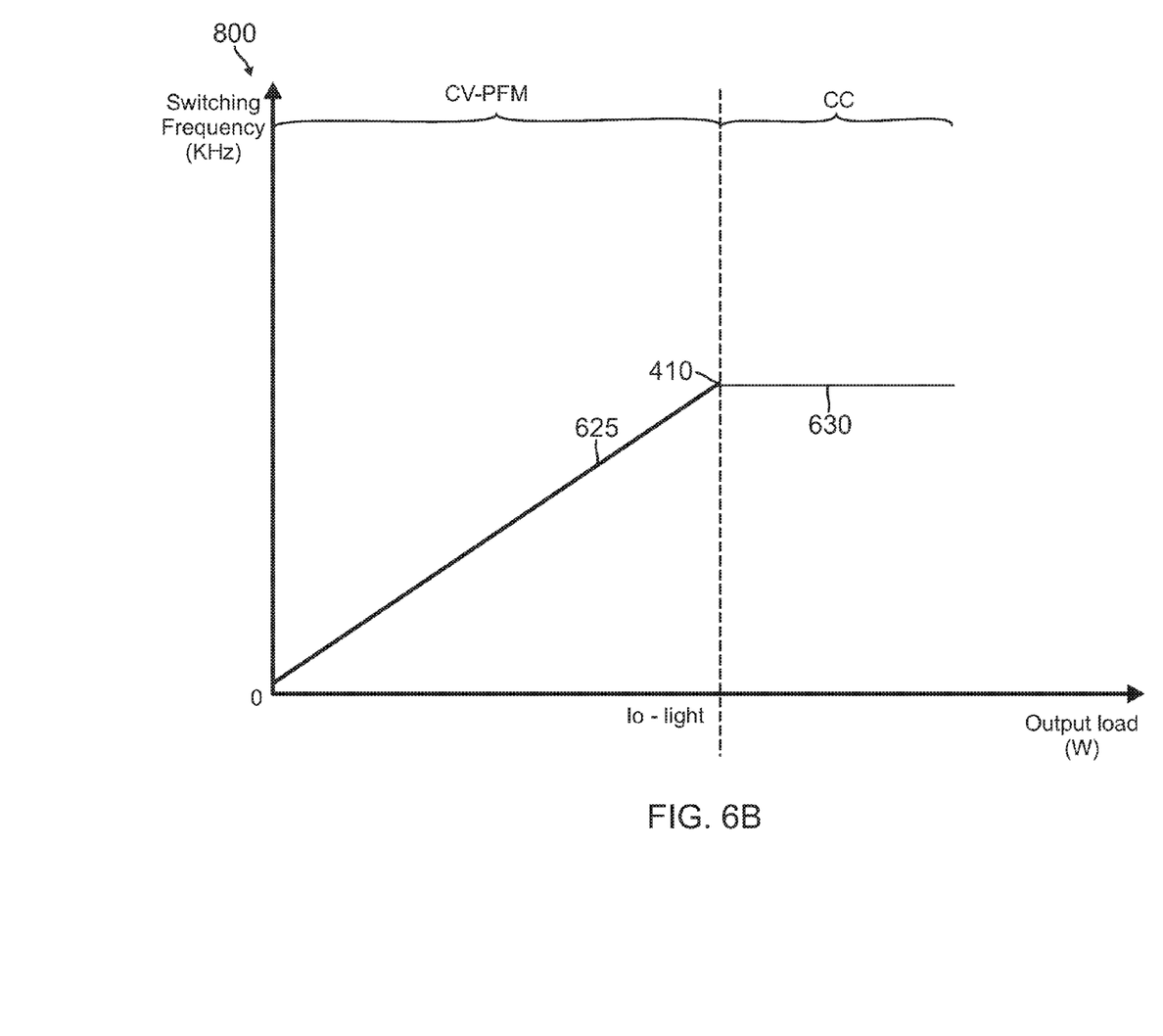
FIG. 6B illustrates the switching frequencies for the modes of FIG. 6A.

The CC peak voltage and CV peak voltage waveforms when a transition is enabled at transition point 410 is shown in FIG. 6A. A CV peak voltage 605 stays constant during CV_PFM operation when the load is less than the Io_light current limit. At higher load levels, CC peak voltage 610 remains constant with the transition level of CV peak voltage 605 at transition point 410. The corresponding switching frequencies as a function of load are shown in FIG. 6B. A CV switching frequency 625 increases during the CV_PFM mode until the Io_light current limit is reached whereupon a transition to CC mode occurs at transition point 410. A CC switching frequency 630 is constant during CC operation based upon the switching period latched at transition point 410.

It thus follows that a switching power converter should operate in (or transition to) constant voltage PFM mode when the ratio of the CV PFM peak voltage (Vipk_CV_PFM) to the CC peak voltage (Vipk_CC) is less than or equal to 1, and should operate in (or transition to) constant current control mode when the ratio of Vipk_CV_PFM to Vipk_CC is greater than 1. A analogous inequality to control the transitions between modes is to operate in CV PFM mode if Vipk_CC is greater than Vipk_CV_PFM and to operate in CC mode when Vipk_CV_PFM is greater than Vipk_CC. At the mode transition point, the switching power converter should also be operating with the same peak voltage value, regardless of whether the switching power converter is operating in the CV PFM mode or the CC mode. That is, the peak voltage value in constant voltage PFM mode (Vipk_CV_PFM) should be the same as the peak voltage value in constant current mode when the switching power converter (Vipk_CC) at the mode transition point.

Using the equality between Vipk_CV_PFM and Vipk_CC at the mode transition point between the CV_PFM mode and the CC mode, equation (2) leads to:

$$\text{Vipk\_CV\_PFM} = \text{Vipk\_CC\_PFM} = \frac{\text{Kcc\_light} \times \text{Tp\_cv\_pfm}}{\text{Treset}} \quad (8)$$

where Kcc_light is a proportionality constant defined for the light load condition and Tp_cv_pfm is the switching period when the switching power converter is operating in the PFM mode at the mode transition point, and Treset is the transformer reset time.

Figure 7:
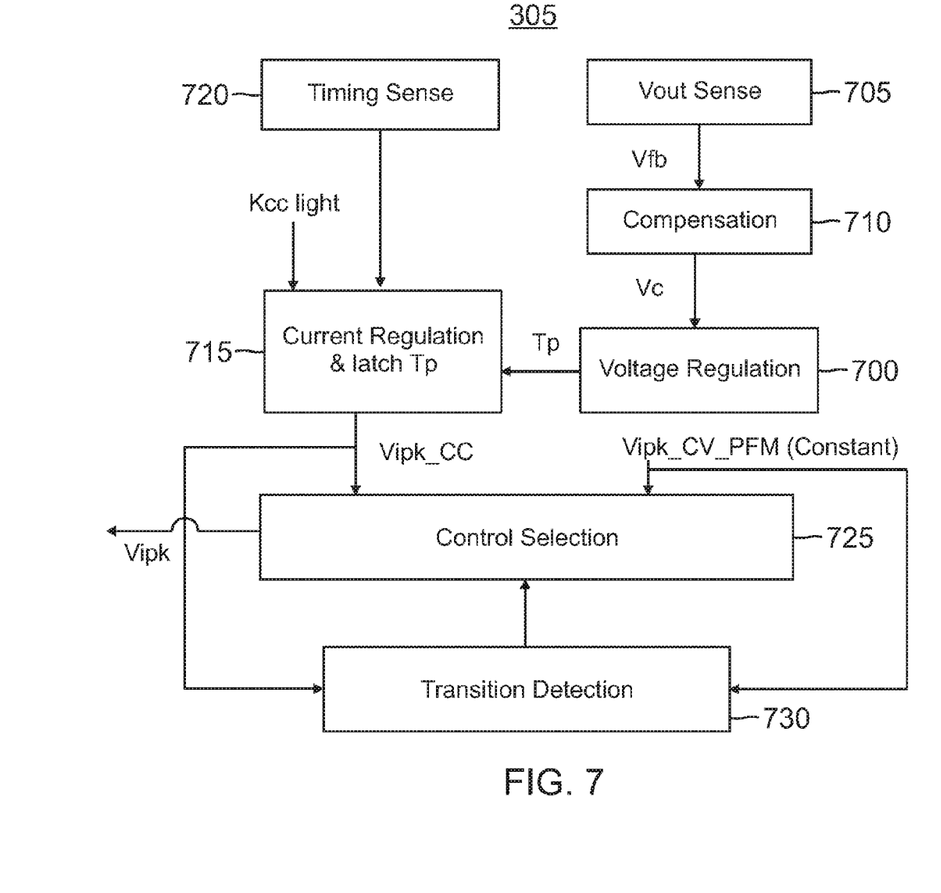
FIG. 7 is a diagram of a controller for enabling a transition between a constant voltage pulse frequency modulation mode and a constant current mode in accordance with an aspect of the disclosure.

Additional details for controller 305 are shown in FIG. 7. A constant voltage regulation module 700 generates a peak voltage for constant voltage PFM mode and also for constant voltage PWM mode. As part of this constant voltage regulation, an output voltage sense module 705 generates a feedback voltage (Vfb) responsive to the difference between the output voltage as sensed through Vsense (FIG. 3) and a reference voltage. A compensation filter 710 compensates the feedback voltage to form a compensated control voltage Vc. Constant output voltage regulation module 700 generates the peak voltage for constant voltage PFM mode (Vipk_CV_PFM) responsive to processing control voltage VC (e.g., through a proportional-integral feedback loop or a proportional-integral-differential feedback loop).

A constant current regulation module 715 functions to generate the peak voltage for the constant current mode (Vipk_CC0 responsive to the timing signals sensed by a timing sensor. At a transition from constant voltage PFM mode to a constant current mode, constant current regulation module 715 receives and latches the switching period Tp (or equivalently, the switching frequency) used by constant voltage regulation module 700 at the time of transition (transition point 410 of FIGS. 4, 6A, and 6B). This switching period is the target switching period in that the actual switching period is affected by factors such as avoiding continuous conduction mode operation or valley-mode switching requirements. The actual switching period in both CC and CV modes may thus vary slightly from the target switching period. Timing sensor 720 thus senses the actual switching period used in a subsequent switching cycle as well as the corresponding transformer reset time. Based upon these factors and also upon the KCC_light constant of Eq (8), constant current regulation module 715 calculates the peak voltage for constant current mode operation (Vipk_CC) for the current switching cycle.

To determine whether operation should proceed in the constant voltage PFM or constant current mode, a transition detection module 730 compares the peak voltages Vipk_CC and Vipk_CV_PFM. For example, transition detection module 730 may determine which of the voltages is greater or use a ratio of the voltage as discussed earlier to determine which mode of operation is appropriate. A control selection module 725 then selects the corresponding voltage (either Vipk_CC or Vipk_CV_PFM) based upon the determination from transition detection module 730 to provide the peak voltage used to compare to the sense resistor voltage to determine when to switch off the power switch transistor in the current switching cycle.

Figure 8:
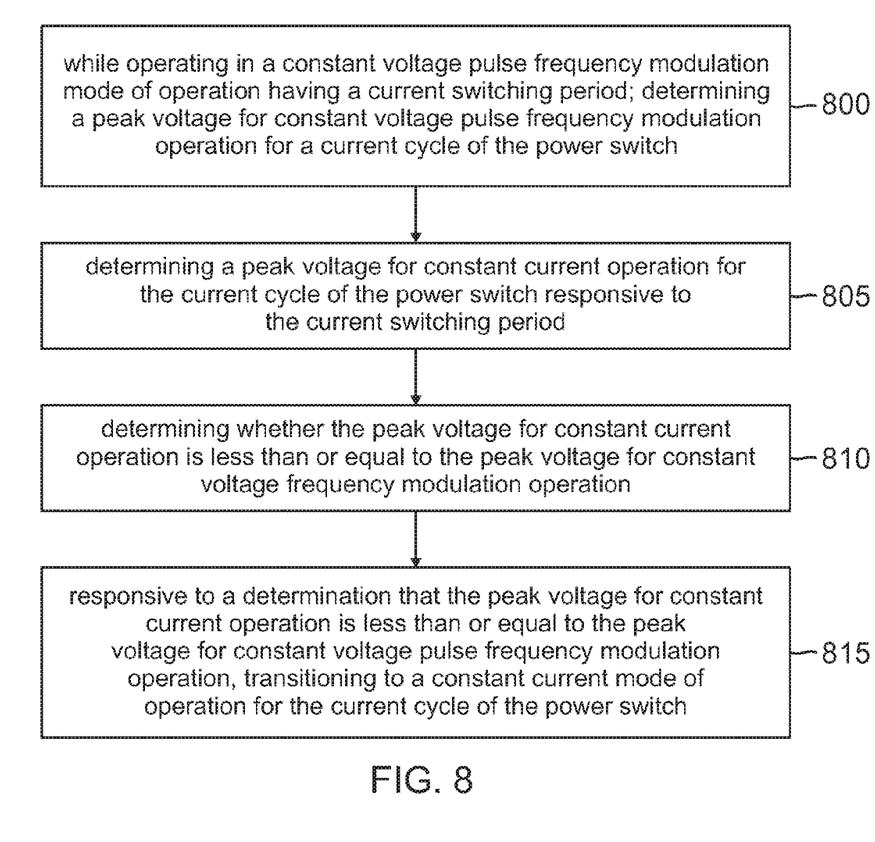
FIG. 8 is a flowchart for a method of operation for the controller of FIG. 7.

A method of operation by controller 305 will now be discussed with regard to the flowchart of FIG. 8. The method includes an act 800 of, while operating in a constant voltage pulse frequency modulation mode of operation having a current switching period; determining a peak voltage for constant voltage pulse frequency modulation operation for a current cycle of the power switch. The determination of the peak voltage by constant voltage regulation module 700 is an example of act 800. The method also includes an act 805 of determining a peak voltage for constant current operation for the current cycle of the power switch responsive to the current switching period. The determination of the peak voltage by constant current regulation module 715 is an example of act 805.

The method also includes an act 810 of determining whether the peak voltage for constant current operation is less than or equal to the peak voltage for constant voltage frequency modulation operation. The determination within transition detection module 730 is an example of act 810. Finally, the method includes an act 815 of, responsive to a determination that the peak voltage for constant current operation is less than or equal to the peak voltage for constant voltage pulse frequency modulation operation, transitioning to a constant current mode of operation for the current cycle of the power switch. The transition to constant current operation by control selection module 725 is an example of act 815.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method of regulating a power switch in a switching power converter, comprising:
    while operating in a constant voltage pulse frequency modulation mode of operation having a current switching period; determining a peak voltage for constant voltage pulse frequency modulation operation for a current cycle of the power switch;
    determining a peak voltage for constant current operation for the current cycle of the power switch responsive to the current switching period;
    determining whether the peak voltage for constant current operation is less than or equal to the peak voltage for constant voltage frequency modulation operation; and
    responsive to a determination that the peak voltage for constant current operation is less than or equal to the peak voltage for constant voltage pulse frequency modulation operation, transitioning to a constant current mode of operation for the current cycle of the power switch.

2. The method of claim 1, further comprising:
    maintaining the constant current mode of operation for subsequent cycles of the power switch so long as a peak voltage for constant current operation for the subsequent cycles of the power switch remains less than or equal to the peak voltage for constant voltage pulse frequency modulation operation for the subsequent cycles of the power switch.

3. The method of claim 2, further comprising:
    transitioning to the constant voltage pulse frequency modulation mode of operation in an additional subsequent cycle of the power switch responsive to a determination that a peak voltage for constant current operation for the additional subsequent cycle of the power switch is greater than a peak voltage for constant voltage pulse frequency modulation operation for the additional subsequent cycle of the power switch.

4. The method of claim 1, wherein determining the peak voltage for constant current operation is further responsive to a transformer reset time for a preceding cycle of the power switch.

5. The method of claim 1, wherein determining the peak voltage for constant current operation is further responsive to a light load proportionality constant (Kcc_light).

6. The method of claim 1, wherein determining whether the peak voltage for constant current operation is less than or equal to the peak voltage for constant voltage frequency modulation operation comprises determining whether a ratio of the peak voltage for constant voltage frequency modulation operation to the peak voltage for constant current operation is less than one.

7. The method of claim 1, further comprising cycling off the power switch in the current cycle of the power switch responsive to the peak voltage for the constant current operation equaling a sense resistor voltage.

8. The method of claim 7, wherein cycling off the power switch in the current cycle of the power switch comprises cycling off an NMOS power switch transistor in a flyback converter.

9. A controller for controlling the cycling of a power switch, comprising:
a constant voltage regulation module configured to determine a peak voltage for constant voltage pulse frequency modulation operation responsive to control voltage and configured to determine a current switching period for the constant voltage pulse frequency modulation;
a constant current regulation module configured to determine a peak voltage for constant current operation responsive to the current switching period; and
a mode transition detection module configured to determine whether the peak voltage for constant current operation is less than the peak voltage for constant voltage pulse frequency modulation operation, wherein the controller is configured to transition to a constant current mode of operation for a current cycle of the power switch responsive to a determination by the mode transition detection module that the peak voltage for constant current operation is less than the peak voltage for constant voltage pulse frequency modulation operation.

10. The controller of claim 9, wherein the controller is further configured to cycle off the power switch in the current cycle of the power switch responsive to a determination that a sense resistor voltage equals the peak voltage for constant current operation.

11. The controller of claim 10, wherein the constant current regulation module is further configured to determine the peak voltage for constant current operation responsive to a transformer reset time in a previous cycle of the power switch.

12. The controller of claim 11, wherein the constant current regulation module is further configured to determine the peak voltage for constant current operation responsive to a light load proportionality constant (Kcc_light).

13. The controller of claim 9, wherein the constant current regulation module is further configured to latch the current switching period.

14. The controller of claim 9, wherein the mode transition detection module is further configured to determine whether the peak voltage for constant current operation is less than the peak voltage for constant voltage pulse frequency modulation operation using a ratio of the peak voltage for constant voltage pulse frequency modulation operation to the peak voltage for constant current operation.

15. The controller of claim 14, wherein the mode transition detection module is further configured to determine whether the ratio is greater than one, and wherein the controller is configured to transition to a constant voltage mode of operation for the current cycle of the power switch responsive to the ratio being greater than one.

16. The controller of claim 9, wherein the power switch is a power switch for a flyback converter.

17. The controller of claim 9, wherein the power switch is a power switch for a buck converter.

18. The controller of claim 9, wherein the power switch is a power switch for a buck-boost converter.

19. A flyback converter, comprising:
a primary winding for a transformer;
a power switch coupled to the primary winding;
a sense resistor coupled between the power switch and ground; and
a controller configured to determine whether a peak voltage for constant voltage pulse frequency modulation operation is greater than a peak voltage for constant current operation, and wherein the controller is further configured to cycle off the power switch in a current cycle of the power switch when a voltage across the sense resistor equals the peak voltage for constant current operation responsive to the peak voltage for constant voltage pulse frequency modulation operation being greater than the peak voltage for constant current operation.

20. The flyback converter of claim 19, wherein the controller is further configured to latch a current switching period for the power switch.

* * * * *

UNITED STATES PATENT AND TRADEMARK OFFICE
CERTIFICATE OF CORRECTION

PATENT NO. : 9,985,532 B1
APPLICATION NO. : 15/401498
DATED : May 29, 2018
INVENTOR(S) : Juyoung Yoon et al.

Page 1 of 1

It is certified that error appears in the above-identified patent and that said Letters Patent is hereby corrected as shown below:

In the Drawings

Sheet 1, Fig. 1, the legend --PRIOR ART-- should be added.

Sheet 2, Fig. 2, the legend --PRIOR ART-- should be added.

Signed and Sealed this
Fourth Day of June, 2019

Andrei Iancu
*Director of the United States Patent and Trademark Office*